US009459397B2

(12) United States Patent
Boomgaarden et al.

(10) Patent No.: US 9,459,397 B2
(45) Date of Patent: Oct. 4, 2016

(54) EDGE LIT LIGHTING DEVICE

(71) Applicant: LIGHTING SCIENCE GROUP CORPORATION, Satellite Beach, FL (US)

(72) Inventors: Mark Penley Boomgaarden, Satellite Beach, FL (US); Ricardo Romeu, Melbourne, FL (US); Eric Holland, Indian Harbour Beach, FL (US); Ryan Kelley, Denver, CO (US)

(73) Assignee: Lighting Science Group Corporation, Cocoa Beach, FL (US)

( * ) Notice: Subject to any disclaimer, the term of this patent is extended or adjusted under 35 U.S.C. 154(b) by 198 days.

(21) Appl. No.: 14/024,280

(22) Filed: Sep. 11, 2013

(65) Prior Publication Data

US 2014/0268870 A1    Sep. 18, 2014

Related U.S. Application Data

(60) Provisional application No. 61/777,585, filed on Mar. 12, 2013.

(51) Int. Cl.
*F21V 7/04*     (2006.01)
*F21V 8/00*     (2006.01)

(52) U.S. Cl.
CPC ........... *G02B 6/0063* (2013.01); *G02B 6/0038* (2013.01); *G02B 6/0045* (2013.01); *G02B 6/0076* (2013.01)

(58) Field of Classification Search
CPC  G02B 6/0018; G02B 6/0055; G02B 6/0063; G02B 6/0038; G02B 6/0045; G02B 6/0076
USPC ................................ 362/623, 624, 625, 626
See application file for complete search history.

(56) References Cited

U.S. PATENT DOCUMENTS 5,057,908 A    10/1991  Weber
5,523,878 A     6/1996  Wallace et al.
(Continued)

FOREIGN PATENT DOCUMENTS

EP      1950491      7/2008
EP      2410240      1/2012
(Continued)

OTHER PUBLICATIONS

U.S. Appl. No. 13/832,900, filed Mar. 2013, Holland et al.
(Continued)

*Primary Examiner* — Andrew Coughlin
*Assistant Examiner* — Glenn Zimmerman
(74) *Attorney, Agent, or Firm* — Mark Malek; Stephen Bullock; Widerman Malek, PL

(57) ABSTRACT

An edge lit lighting device including a housing, a power circuit, a light source, and an optic. The power circuit may be carried by the housing, and adapted to form an electrical connection with an external power source. The light source may be carried by the housing and electrically connected to the power circuit. The optic may be carried by the housing and positioned in optical communication with the light source. The optic may further include a receiving surface positioned adjacent to the light source, and first and second emitting surfaces. The first emitting surface may include a plurality of features configured to redirect light defined as redirected light in a direction of the second emitting surface, the redirected light being emitted from the second emitting surface. The lighting device may further include pluralities of optics of light sources.

15 Claims, 5 Drawing Sheets

(56) References Cited

U.S. PATENT DOCUMENTS

| | | |
|---|---|---|
| 5,704,701 A | 1/1998 | Kavanagh et al. |
| 5,997,150 A | 12/1999 | Anderson |
| 6,140,646 A | 10/2000 | Busta et al. |
| 6,290,382 B1 | 9/2001 | Bourn et al. |
| 6,341,876 B1 | 1/2002 | Moss et al. |
| 6,356,700 B1 | 3/2002 | Strobl |
| 6,370,168 B1 | 4/2002 | Spinelli |
| 6,542,671 B1 | 4/2003 | Ma et al. |
| 6,561,656 B1 | 5/2003 | Kojima et al. |
| 6,594,090 B2 | 7/2003 | Kruschwitz et al. |
| 6,647,199 B1 | 11/2003 | Pelka et al. |
| 6,707,611 B2 | 3/2004 | Gardiner et al. |
| 6,733,135 B2 | 5/2004 | Dho |
| 6,767,111 B1 | 7/2004 | Lai |
| 6,787,999 B2 | 9/2004 | Stimac et al. |
| 6,799,864 B2 | 10/2004 | Bohler et al. |
| 6,817,735 B2 | 11/2004 | Shimizu et al. |
| 6,870,523 B1 | 3/2005 | Ben-David et al. |
| 6,871,982 B2 | 3/2005 | Holman et al. |
| 6,893,140 B2 | 5/2005 | Storey et al. |
| 6,945,672 B2 | 9/2005 | Du et al. |
| 6,964,501 B2 | 11/2005 | Ryan |
| 6,967,761 B2 | 11/2005 | Starkweather et al. |
| 6,974,713 B2 | 12/2005 | Patel et al. |
| 7,042,623 B1 | 5/2006 | Huibers et al. |
| 7,070,281 B2 | 7/2006 | Kato |
| 7,072,096 B2 | 7/2006 | Holman et al. |
| 7,075,707 B1 | 7/2006 | Rapaport et al. |
| 7,083,304 B2 | 8/2006 | Rhoads |
| 7,178,941 B2 | 2/2007 | Roberge et al. |
| 7,178,946 B2 | 2/2007 | Saccomanno et al. |
| 7,184,201 B2 | 2/2007 | Duncan |
| 7,246,923 B2 | 7/2007 | Conner |
| 7,255,469 B2 | 8/2007 | Wheatley et al. |
| 7,261,453 B2 | 8/2007 | Morejon et al. |
| 7,289,090 B2 | 10/2007 | Morgan |
| 7,300,177 B2 | 11/2007 | Conner |
| 7,303,291 B2 | 12/2007 | Ikeda et al. |
| 7,306,352 B2 | 12/2007 | Sokolov et al. |
| 7,325,956 B2 | 2/2008 | Morejon et al. |
| 7,342,658 B2 | 3/2008 | Kowarz et al. |
| 7,344,279 B2 | 3/2008 | Mueller et al. |
| 7,344,280 B2 | 3/2008 | Panagotacos et al. |
| 7,349,095 B2 | 3/2008 | Kurosaki |
| 7,353,859 B2 | 4/2008 | Stevanovic et al. |
| 7,382,091 B2 | 6/2008 | Chen |
| 7,382,632 B2 | 6/2008 | Alo et al. |
| 7,400,439 B2 | 7/2008 | Holman |
| 7,427,146 B2 | 9/2008 | Conner |
| 7,429,983 B2 | 9/2008 | Islam |
| 7,431,489 B2 | 10/2008 | Yeo et al. |
| 7,434,946 B2 | 10/2008 | Huibers |
| 7,438,443 B2 | 10/2008 | Tatsuno et al. |
| 7,476,016 B2 | 1/2009 | Kurihara |
| 7,520,642 B2 | 4/2009 | Holman et al. |
| 7,530,708 B2 | 5/2009 | Park |
| 7,537,347 B2 | 5/2009 | Dewald |
| D593,963 S | 6/2009 | Plonski et al. |
| 7,540,616 B2 | 6/2009 | Conner |
| 7,545,569 B2 | 6/2009 | Cassarly |
| 7,556,406 B2 | 7/2009 | Petroski et al. |
| 7,598,686 B2 | 10/2009 | Lys et al. |
| 7,605,971 B2 | 10/2009 | Ishii et al. |
| 7,626,755 B2 | 12/2009 | Furuya et al. |
| 7,670,021 B2 | 3/2010 | Chou |
| 7,677,736 B2 | 3/2010 | Kasazumi et al. |
| 7,684,007 B2 | 3/2010 | Hull et al. |
| 7,703,943 B2 | 4/2010 | Li et al. |
| 7,709,811 B2 | 5/2010 | Conner |
| 7,719,766 B2 | 5/2010 | Grasser et al. |
| 7,748,870 B2 | 7/2010 | Chang et al. |
| 7,762,315 B2 | 7/2010 | Shen |
| 7,766,490 B2 | 8/2010 | Harbers et al. |
| 7,771,085 B2 | 8/2010 | Kim |
| 7,819,556 B2 | 10/2010 | Heffington et al. |
| 7,824,075 B2 | 11/2010 | Maxik et al. |
| 7,828,453 B2 | 11/2010 | Tran et al. |
| 7,828,465 B2 | 11/2010 | Roberge et al. |
| 7,832,878 B2 | 11/2010 | Brukilacchio et al. |
| 7,834,867 B2 | 11/2010 | Sprague et al. |
| 7,835,056 B2 | 11/2010 | Doucet et al. |
| 7,845,823 B2 | 12/2010 | Mueller et al. |
| 7,883,241 B2 | 2/2011 | Ho |
| 7,889,430 B2 | 2/2011 | El-Ghoroury et al. |
| 7,906,722 B2 | 3/2011 | Fork et al. |
| 7,922,356 B2 | 4/2011 | Maxik et al. |
| 7,923,748 B2 | 4/2011 | Ruffin |
| 7,928,565 B2 | 4/2011 | Brunschwiler et al. |
| 7,976,205 B2 | 7/2011 | Grotsch et al. |
| 8,016,443 B2 | 9/2011 | Falicoff et al. |
| 8,021,019 B2 | 9/2011 | Chen et al. |
| 8,038,314 B2 | 10/2011 | Ladewig |
| 8,047,660 B2 | 11/2011 | Penn et al. |
| 8,061,857 B2 | 11/2011 | Liu et al. |
| 8,070,302 B2 | 12/2011 | Hatanaka et al. |
| 8,070,324 B2 | 12/2011 | Kornitz et al. |
| 8,083,364 B2 | 12/2011 | Allen |
| 8,096,668 B2 | 1/2012 | Abu-Ageel |
| 8,125,776 B2 | 2/2012 | Alexander et al. |
| 8,201,968 B2 | 6/2012 | Maxik et al. |
| 8,251,561 B2 | 8/2012 | Montgomery et al. |
| 8,272,763 B1 | 9/2012 | Chinnam et al. |
| 8,297,783 B2 | 10/2012 | Kim |
| 8,297,798 B1 | 10/2012 | Pittman et al. |
| 8,322,889 B2 | 12/2012 | Petroski |
| 8,328,406 B2 | 12/2012 | Zimmermann |
| 8,331,099 B2 | 12/2012 | Geissler et al. |
| 8,337,029 B2 | 12/2012 | Li |
| 8,337,063 B2 | 12/2012 | Nagasawa et al. |
| 8,337,066 B2 | 12/2012 | Yeh et al. |
| 8,419,249 B2 | 4/2013 | Yatsuda et al. |
| 8,427,590 B2 | 4/2013 | Raring et al. |
| 8,459,856 B2 | 6/2013 | Meir et al. |
| 8,531,126 B2 | 9/2013 | Kaihotsu et al. |
| 8,585,242 B2 | 11/2013 | Walczak et al. |
| 8,608,341 B2 | 12/2013 | Boomgaarden et al. |
| 8,608,348 B2 | 12/2013 | Maxik et al. |
| 8,616,736 B2 | 12/2013 | Pan |
| 2002/0151941 A1 | 10/2002 | Okawa et al. |
| 2004/0052076 A1 | 3/2004 | Mueller et al. |
| 2005/0033119 A1 | 2/2005 | Okawa et al. |
| 2005/0117370 A1* | 6/2005 | Kawashima ......... G02B 6/0038 362/615 |
| 2006/0002108 A1 | 1/2006 | Ouderkirk et al. |
| 2006/0002110 A1 | 1/2006 | Dowling et al. |
| 2006/0103777 A1 | 5/2006 | Ko et al. |
| 2006/0164005 A1 | 7/2006 | Sun |
| 2006/0285193 A1 | 12/2006 | Kimura et al. |
| 2007/0013871 A1 | 1/2007 | Marshall et al. |
| 2007/0041167 A1 | 2/2007 | Nachi |
| 2007/0103908 A1* | 5/2007 | Tabito et al. .................. 362/294 |
| 2007/0188847 A1 | 8/2007 | McDonald et al. |
| 2007/0241340 A1 | 10/2007 | Pan |
| 2008/0143973 A1 | 6/2008 | Wu |
| 2008/0198572 A1 | 8/2008 | Medendorp |
| 2008/0205035 A1* | 8/2008 | Asvadi ..................... G09F 9/33 362/103 |
| 2008/0232084 A1 | 9/2008 | Kon |
| 2008/0232116 A1 | 9/2008 | Kim |
| 2009/0033832 A1* | 2/2009 | Pai .................. 349/65 |
| 2009/0059099 A1 | 3/2009 | Linkov et al. |
| 2009/0059585 A1 | 3/2009 | Chen et al. |
| 2009/0128781 A1 | 5/2009 | Li |
| 2009/0141506 A1 | 6/2009 | Lan et al. |
| 2009/0232683 A1 | 9/2009 | Hirata et al. |
| 2010/0006762 A1 | 1/2010 | Yoshida et al. |
| 2010/0039704 A1 | 2/2010 | Hayashi et al. |
| 2010/0103389 A1 | 4/2010 | McVea et al. |
| 2010/0202129 A1 | 8/2010 | Abu-Ageel |
| 2010/0231863 A1 | 9/2010 | Hikmet et al. |
| 2010/0244700 A1 | 9/2010 | Chong et al. |
| 2010/0315320 A1 | 12/2010 | Yoshida |
| 2010/0321641 A1 | 12/2010 | Van Der Lubbe |
| 2011/0205738 A1 | 8/2011 | Peifer et al. |

(56) References Cited

U.S. PATENT DOCUMENTS

| | | | |
|---|---|---|---|
| 2011/0309735 A1* | 12/2011 | Parker | F21K 9/135 313/46 |
| 2012/0002411 A1 | 1/2012 | Ladewig | |
| 2012/0051041 A1 | 3/2012 | Edmond et al. | |
| 2012/0106144 A1 | 5/2012 | Chang | |
| 2012/0201034 A1 | 8/2012 | Li | |
| 2012/0217861 A1 | 8/2012 | Soni | |
| 2012/0218774 A1 | 8/2012 | Livingston | |
| 2012/0224106 A1* | 9/2012 | Kosaka et al. | 348/725 |
| 2012/0236590 A1* | 9/2012 | Parker | G02B 6/0035 362/607 |
| 2012/0236595 A1* | 9/2012 | Parker | G02B 6/0035 362/609 |
| 2012/0236598 A1 | 9/2012 | Germain et al. | |
| 2012/0262634 A1* | 10/2012 | Takano | G02B 6/0055 348/790 |
| 2012/0262902 A1 | 10/2012 | Pickard et al. | |
| 2012/0262921 A1 | 10/2012 | Boomgaarden et al. | |
| 2012/0268894 A1 | 10/2012 | Alexander et al. | |
| 2012/0327650 A1 | 12/2012 | Lay et al. | |
| 2013/0021792 A1 | 1/2013 | Snell et al. | |
| 2013/0120963 A1 | 5/2013 | Holland et al. | |
| 2013/0128568 A1* | 5/2013 | Wang | A01K 63/06 362/218 |
| 2013/0223055 A1 | 8/2013 | Holland et al. | |
| 2013/0294071 A1 | 11/2013 | Boomgaarden et al. | |
| 2013/0294087 A1 | 11/2013 | Holland et al. | |
| 2013/0301238 A1 | 11/2013 | Boomgaarden et al. | |
| 2013/0322076 A1* | 12/2013 | Parker | G02B 6/0075 362/240 |

FOREIGN PATENT DOCUMENTS

| | | |
|---|---|---|
| WO | WO2008137732 | 11/2008 |
| WO | WO 2009040703 | 4/2009 |

OTHER PUBLICATIONS

U.S. Appl. No. 14/014,512, filed Aug. 2013, Boomgaarden et al.

Arthur P. Fraas, Heat Exchanger Design, 1989, p. 60, John Wiley & Sons, Inc., Canada.

EP International Search Report for Application No. 10174449.8; (Dec. 14, 2010).

H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.

J. Y. San, C. H. Huang, M. H, Shu, "Impingement cooling of a confined circular air jet", In t. J. Heat Mass Transf., 1997. pp. 1355-1364, vol. 40.

N. T. Obot, W. J. Douglas, A S. Mujumdar, "'Effect of Semi-confinement on Impingement Heat Transfer", Proc. 7th Int. Heat Transf. Conf., 1982, pp. 1355-1364. vol. 3.

S. A Solovitz, L. D. Stevanovic, R. A Beaupre, "Microchannels Take Heatsinks to the Next Level", Power Electronics Technology, Nov. 2006.

Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

\* cited by examiner

EDGE LIT LIGHTING DEVICE

RELATED APPLICATIONS

This application claims the benefit of U.S. Provisional Patent Application Ser. No. 61/777,585 titled Edge Lit Lighting Device filed Mar. 12, 2013, the entire contents of which are incorporated herein by reference.

FIELD OF THE INVENTION

The present invention relates to edge lit lighting devices.

BACKGROUND

Traditionally, lighting fixtures have utilized an approach to lighting where light is configured to pass through an optic along a generally orthogonal propagation path. However, such a method of illumination has the disadvantage of line-of-sight perception of the light source by an observer, and a concentration of light along the line-of-sight that can be uncomfortable when perceived. Moreover, solutions to this problem usually include the use of a diffusive element, generally reducing the efficiency in lighting, requiring either acceptance of reduced illuminating efficiency or an increased consumption of power to provide the desired illumination.

Edge lighting has been used in non-illuminating industries, including illumination of decorative glass, particularly with etching, and in providing backlighting in television sets. However, such systems do not provide sufficient brightness for illuminating purposes. Accordingly, there is a need in the art for an edge lit lighting device.

SUMMARY

In an embodiment of the invention there is presented an edge lit lighting device. The lighting device may include a housing, a power circuit, a light source, and an optic. The power circuit may be carried by the housing, and may be adapted to form an electrical connection with an external power source. The light source may be carried by the housing and electrically connected to the power circuit. The optic may be carried by the housing and positioned in optical communication with the light source.

The optic may further include a receiving surface positioned adjacent to the light source, and first and second emitting surfaces. The first emitting surface may include a plurality of features configured to redirect light defined as redirected light in a direction of the second emitting surface, the redirected light being emitted from the second emitting surface. In some embodiments, the features are a series of horizontal and slanted sections. In some embodiments, the features are a series of first slanted sections, vertical sections, and second slanted sections. Furthermore, the light source may be positioned so as to emit light in a direction substantially perpendicular to the direction light is emitted from the second emitting surface. Additionally, the optic may be configured to extend generally outward from the housing.

In additional embodiments, the lighting device may include a second light source and a second optic, each similarly carried by the housing and being similar or identical to the original optic and light source. The optics may be positioned generally parallel to each other, or may be generally non-parallel.

DETAILED DESCRIPTION OF THE PREFERRED EMBODIMENT

Figure 1:
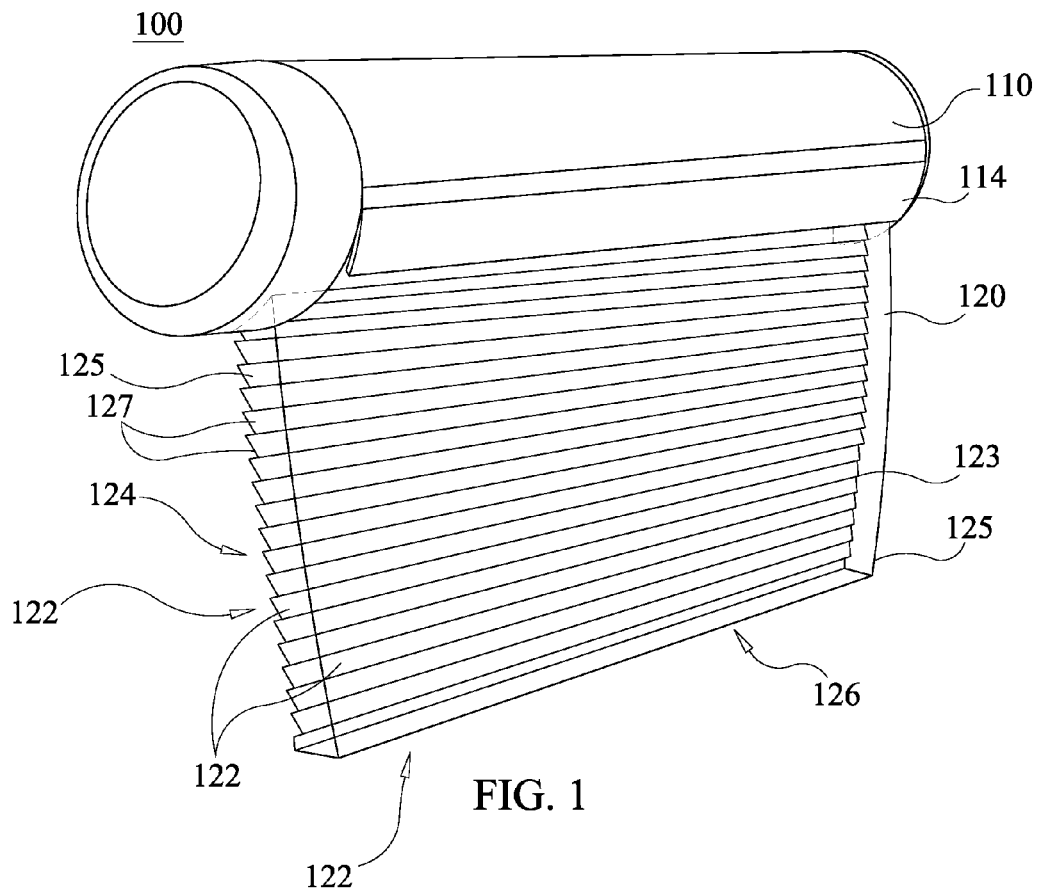
FIG. 1 is a perspective view of an edge lit lighting device according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Throughout this disclosure, the present invention may be referred to as relating to luminaires, digital lighting, light sources, and light-emitting diodes (LEDs). Those skilled in the art will appreciate that this terminology is only illustrative and does not affect the scope of the invention. For instance, the present invention may just as easily relate to lasers or other digital lighting technologies. Additionally, a person of skill in the art will appreciate that the use of LEDs within this disclosure is not intended to be limited to any specific form of LED, and should be read to apply to light emitting semiconductors in general. Accordingly, skilled artisans should not view the following disclosure as limited to any particular light emitting semiconductor device, and should read the following disclosure broadly with respect to the same.

Furthermore, while the invention is directed to an edge lit lighting device, terms such as "lighting device," "luminaire," "security light," and "light" are used for the convenience of the reader, may be used interchangeably, and do not in any way limit or stray from the invention.

An embodiment of the invention, as shown and described by the various figures and accompanying text, provides an edge lit lighting device. The edge lit device may be generally frameless on many sides, permitting light to be emitted in a substantial majority of a sphere surrounding the edge lit lighting device. Additionally, the edge lit lighting device may be configured to emit light primarily in a first direction, while light may be emitted in other directions secondarily. In some embodiments, the lighting device may be employed as a security light.

Referring now to FIG. 1, an edge lit lighting device 100 according to an embodiment of the present invention is depicted. The lighting device 100 may include a housing 110, an optic 120, and a light source 130 (shown in FIG. 2). The light source 130 may be carried by the housing 110 and positioned such that light emitted thereby enters the optic 120. The optic 120 may be formed of a transparent or translucent material that is configured to receive light from the light source 130 and refract, reflect, or otherwise redirect light to be emitted from a surface of the optic 120. The optic 120 may be configured to extend outward from the housing 110, in the present embodiment extending generally downward.

Figure 2:
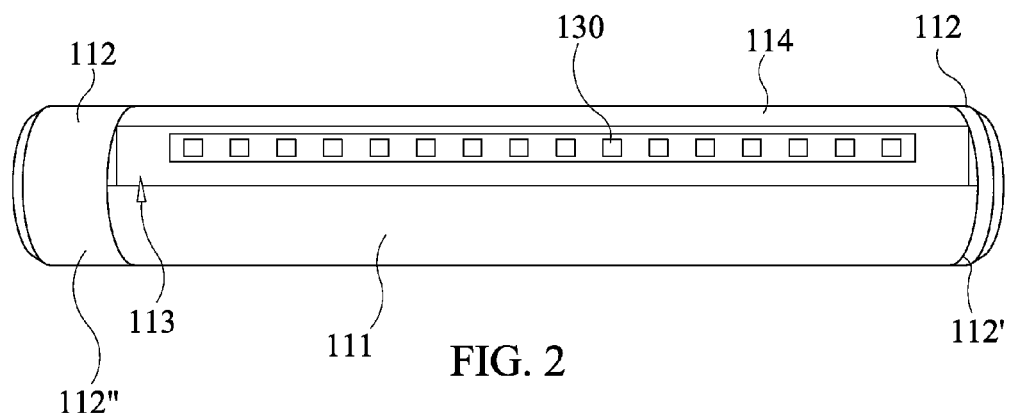
FIG. 2 is a bottom view of the lighting device depicted in FIG. 1 with an optic of the lighting device removed.

Referring now to FIG. 2, the housing 110 will now be discussed in greater detail. The housing 110 may be generally configured to carry each of the optic 120 and the light source 130. Accordingly, the housing 110 may be configured to permit attachment of the optic 120 and the light source 130 thereto. Each of the optic 120 and the light source 130 may be attached according to any mean, method, or use of any device known in the art. Types of attachments may include, but are not limited to, fasteners, clasps, glues, adhesives, welding, interference fits, and any other method known in the art.

The housing 110 may further include an outer surface including an attachment surface. The attachment surface may be configured to facilitate the attachment of the lighting device 100 to a structure, such as a wall, ceiling, or pole. The attachment surface may include any feature to facilitate such attachment, such as a generally flat surface, holes, including holes configured to cooperate with a fastener, such as a screw. It is contemplated that any method of attachment known in the art may be embodied in and facilitated by the attachment surface.

The housing 110 may be fabricated of any material to which the optic 120 and the light source 130 may be attached. Moreover, the housing 110 may be fabricated of a material having desirable characteristics, including weight, strength-to-weight ratio, cost, fabrication time, formability, durability, chemical reactance, and thermal dissipation capacity. For example, and not by means of limitation, the housing 110 may be fabricated from metals, metal alloys, plastics, polymers, and any other suitable material.

The housing 110 may include a center member 111 and one or more end members 112. The center member 111 may be configured to include a void 113. The void 113 may be configured to permit each of the optic (not shown) and the light source 130 to be positioned therein. Moreover, the void 113 may be defined by features of the center member 111 to which each of the optic and the light source 130 may be attached thereto. The void 113 may further be defined by each of the end members 112. Additionally, the void 113 may be configured to permit circuitry associated with the light source 130 therein. For example, the void 113 may be configured to permit one or more printed circuit boards (PCBs) therein, the PCBs including circuitry necessary to provide power for the light source 130, and circuitry necessary to drive and control the operation of the light source 130. Furthermore, the housing 110 may include holes, openings, apertures, or any other feature to facilitate the electrical connection between the light source 130 and its associated circuitry, as well as between the circuitry and an external power source. In some embodiments, the circuitry may further include a battery, in some further embodiments a rechargeable battery that permits the operation of the lighting device 100 without an electrical connection to an external power source.

In some embodiments, the end members 112 may be similarly sized. In some other embodiments, the end members 112 may be sized differently. As depicted in FIG. 2, a first end member 112' is smaller when compared to a second end member 112". In some embodiments, the second end member 112" may be configured to define a void (not shown) to permit the positioning therewithin of various elements of the lighting device 100. For example, the circuitry associated with the light source 130 may be positioned within the void of the second end member 112" instead of the void 113 of the center member 111. In some further embodiments, another electrical device and/or circuitry associated therewith may be positioned within the void. Furthermore, in some embodiments, the end piece 112" may include an opening, aperture, or port permitting communication between the void and the environment surrounding the lighting device 100. The type of communication may be fluid, electromagnetic, atmospheric, or permit the positioning of an element therethrough. Types of electrical devices may include light sensors, occupancy sensors, movement sensors, gas sensors, communication devices, global positioning system (GPS) devices, timing devices, such as an atomic clock, and any other electrical device. Moreover, the electrical device may be placed in electrical communication with the circuitry associated with the light source 130, and the associated circuitry may operate the light source 130 responsive to communications received from the electrical device. Furthermore, it is appreciated that in some embodiments the electrical device may be positioned within the void 113.

The housing 110 may fabricated of a material having desired characteristics. For example, the housing may be fabricated of a material having desirable thermal characteristics, such as desired heat dissipation capacity. In some embodiments, the housing 110 may be positioned in thermal communication with heat generating elements of the lighting device 100, such as, for example, the light source 130. In such embodiments, the housing 110 may dissipate heat generated by the light source 130 to maintain a desired operating temperature of the light source 130. In some embodiments, the housing 110 may further include structural features to increase the thermal dissipative capacity of the housing 110. Those features may include, but are not limited to, fins, openings, grooves, and the like. Additionally, in some embodiments, the lighting device may further include an active heat sink element. The active heat sink element may be the electrical device described hereinabove. Furthermore, the active heat sink may, in some embodiments, be a fan. In some other embodiments, the active heat sink element may be the device described in U.S. patent application Ser. No. 13/107,782 titled Sound Baffling Cooling System for LED Thermal Management and Associated Methods filed May 13, 2011, the content of which is incorporated in its entirety herein.

Referring now back to FIG. 1 and additionally to FIG. 2, additional aspects of the body member 110 will be discussed in greater detail. The body member 110 may further include a light shield 114. The light shield 114 may be configured to generally obscure the light source 130 from being directly perceivable from the environment surrounding the lighting device 100. Accordingly, the light shield 114 may be configured to extend from the center member 111 such that light emitted by the light source 130 is either absorbed or reflected by the light shield 114. The length and direction of the extension of the light shield 114 may be configured such that light emitted by the light source 130 is perceivable only after traversing through and being emitted by the optic 120.

Continuing to refer to FIG. 1, the optic 120 will now be discussed in greater detail. The optic 120 may be carried by the housing 110 and positioned in optical communication with the light source 130 such that light emitted by the light source is received by the optic 120. Accordingly, the optic 120 may include a receiving surface (not shown) positioned adjacent the light source 130. The optic may further include a plurality of emitting surfaces 122. The number and configuration of the emitting surfaces 122 will depend on the configuration of the optic 120. More specifically, the geometric configuration of the optic 120 will determine the number and shape of the emitting surfaces 122. In the present embodiment, the optic 120 is configured to have a generally rectangular geometric configuration. Accordingly, the emitting surfaces may include a front surface 123, a rear surface 124, side surfaces 125, and a lower surface 126. In most embodiments, the geometric configuration of the optic 120 will be such that it includes the front surface 123 and the rear surface 124. Other geometric configurations include, but are not limited to, ovals, semicircles, triangles, and any other geometric configuration. Moreover, each of the receiving surface and the various emitting surfaces 122 may be formed so as to have a selected shape, including, but not limited to, rectangles, ovals, triangles, ellipses, and any other geometric configuration, including non-regular configurations.

The optic 120 may be configured to emit light generally uniformly across the individual emitting surfaces 122. That is to say, while light emitted from one emitting surface 122 may be different in proportion to light emitted by another emitting surface 122, light emitted from the surface area of a single emitting surface 122 may be generally uniform. The uniformity may apply to a left-to-right perspective, a top-to-bottom perspective, or both. The uniformity of light emitted by the emitting surfaces may depend on the light emitted by the light source 130 as well as the configuration of the optic 120, including the configuration of each of the emitting surfaces 122.

The optic 120 may be configured to primarily emit light from one of the emitting surfaces 122. The relative proportion of light emitted by one of the emitting surfaces 122 compared to the other emitting surfaces 122 may be determined by a number of factors, including surface features, relative surface area, and direction relative to the light source 130.

In some embodiments, one or more of the emitting surfaces 122 may include surface features configured to alter the emission pattern of light therefrom. For example, in the present embodiment, each of the front surface 123, the side surfaces 125, and the lower surface 126 have generally smooth surfaces, generally permitting light to be emitted therefrom without impediment. Furthermore, in the present embodiment, the rear surface 124 comprises a plurality of features 127. The plurality of features 127 may be configured to generally reflect, refract, or otherwise redirect light from the rear surface 124 such that light is inhibited from being emitted from the rear surface 124. The plurality of features 127 may include any optical features known in the art to reflect, refract, or otherwise redirect light incident thereupon or therethrough. In the present embodiment, the plurality of features 127 may include alternating generally horizontal sections and slanted sections. As such, light that is transmitted through the optic 120 and incident upon the plurality of features 127 may be generally reflected, refracted, or otherwise redirected such that is substantially redirected away from and not emitted by the rear surface 124.

The light redirected by the plurality of features 127 may be redirected in the direction of the other emitting surfaces 122. Furthermore, where the optic 120 is configured to have a principal emitting surface, the plurality of features 127 may be configured to redirect light primarily in the direction of the principal emitting surface. In the present embodiment, where the front surface 123 is a principal emitting surface, the plurality of features may be configured to redirect light primarily in the direction of the front surface 123.

Additionally, the emitting surfaces 122 may further include a coating, application, or other additional material positioned adjacent the emitting surface to further reflect, refract, or otherwise redirect light therefrom. For example, in some embodiments, the rear surface 124 may further include a reflective surface applied thereto, for example applied to the plurality of features 127, to reflect light back into the optic 120, thereby preventing light from being emitted therefrom. Such an additional feature may be selectively incorporated into any of the emitting surfaces 122.

Furthermore, in some embodiments, one or more of the emitting surfaces 122 may include a color conversion layer. The color conversion layer may be configured to receive light within a first wavelength range and emit a converted light within a second wavelength range. More disclosure related to color conversion layers may be found in U.S. patent application Ser. No. 13/234,604 titled Remote Light Wavelength Conversion Device and Associated Methods filed Sep. 16, 2011, the content of which is incorporated in its entirety herein.

Another characteristic of the emitting surfaces 122 that will determine the amount of light emitted thereby is the relative surface of an emitting surface 122 compared to the other emitting surfaces 122. Generally, not considering other factors, an emitting surface 122 with a relatively larger surface area will emit a greater proportion of light than an emitting surface 122 with a relatively smaller surface area. Accordingly, the emitting surfaces 122 may be configured to have varying surface areas to alter from what surface, and by extension in what direction, light will be emitted. In the present embodiment, each of the front surface 123 and the rear surface 124 have surface areas that are larger than the surface areas of the side surfaces 125 and the lower surface 126. Accordingly, not accounting for the plurality of features 127, each of the front surface 123 and the rear surface 124 will generally emit more light than the side surfaces 125 and the lower surface 126.

Additionally, the optic 120 may include other characteristics to impact how light is emitted by the optic 120. For example, the optic 120 may include a curvature to alter the emission characteristics of the emitting surfaces 122. In the present embodiment, the optic 120 includes a curvature such that front surface 123 is generally convex, and the rear surface 124 is generally concave. Accordingly, light emitted by the front surface 123 may be generally more divergent upon emission from therefrom, and light emitted by the rear surface 124 may be more convergent upon emission therefrom. The optic 120 may include a curvature in any manner that affects the emission of light from the emitting surfaces 122.

Notably, the optic 120 is attached to the housing 110 only generally towards the upper end of the optic 120. There are no other structural members attached to the optic 120 or providing any structural support. Moreover, as the light source 130 is carried by and positioned adjacent the housing 110, there are no other additional light sources along the length of the optic 120. Accordingly, the optic 120 has no need for any structural elements that would otherwise cover the side surfaces 125 and/or the lower surface 126. Therefore, the lighting device 100 may be generally frameless about the sides and bottom of the optic 120, and light may be emitted from the aforementioned surfaces.

The optic 120 may be configured to emit light in primarily one direction. That primary direction may be associated with one of the emitting surfaces 122, in that one emitting surface 122 may emit light principally in the primary direction. In the present embodiment, the optic 120 is configured to emit light in a direction associated with the direction of emission from the front surface 123. Accordingly, the optic 120, in this particular embodiment, is configured to include a number of characteristics designed to increase the emission of light from the front surface 123. The characteristics include the surface area of the front surface 123 and the plurality of features of the rear surface 124, which are configured to redirect light in the direction of the first surface 123 through the optic. Furthermore, the curvature of the optic 120 further affects the direction of light emitted by the front surface 123 to be divergent therefrom, thereby illuminating a broader area compared to embodiments where the optic 120 does not include a curvature. These and any other characteristic of the optic 120 may cooperate to affect the emission of light by the optic 120.

Referring now to FIG. 2, the light source 130 will now be discussed in greater detail. The light source 130 may be any light emitting element that may cooperate with the optic 120 to emit light as described hereinabove. The light source may be, for example, incandescent lights, fluorescent lights, light-emitting semiconductors such as light emitting diodes (LEDs), arc lights, halogen lights, and any other device known in the art. In the present embodiment, the light source 130 may include a plurality of LEDs. The light source 130 may be positioned in electrical communication with the associated circuitry described hereinabove, the associated circuitry being positioned within at least one of the void 113 and the void of the second end member 112". Furthermore, the light source 130 may receive electrical power from a power circuit of the associated circuitry, the power circuit being configured to supply the light source of appropriate current and conditioning for the operation of the light source 130. Additionally, the light source 130 may be operated by a driver circuit of the associated circuitry.

The light source 130 may be positioned so as to emit light generally in the direction of the optic 120 (shown in FIG. 1). The light source 130 may be configured to emit light approximately uniformly across the receiving surface of the optic 120. Furthermore, the light source 130 may be configured to emit light such that the optic 120 emits light approximately uniformly from a left-to-right perspective. In the present embodiment, the light source 130 may include a plurality of LEDs positioned in a spaced apart arrangement. The plurality of LEDs may be spaced at approximately uniform intervals and run across the substantial length of the void 113 such that the LEDs are collinear. The plurality of LEDs may include LEDs of similar types, or it may include LEDs of varying types. The LEDs may vary by the type of light emitted, including brightness, color, color temperature, color rendering index (CRI), and any other characteristic of art known in the industry. The light emitted by the plurality of LEDs may combine to form a combined light. The LEDs forming the plurality of LEDs may be selected to have individual characteristics that, when combined, form a combined light having desired characteristics. In some embodiments, the combined light may be a white light. In some embodiments, the combined light may have a CRI of 90 or above. In some embodiments, the combined light may have a color temperature within the range from about 2,000 Kelvin to about 8,000 Kelvin. In some embodiments, the combined light may have a brightness within the range from about 500 lumens to about 10,000 lumens.

Figure 3:
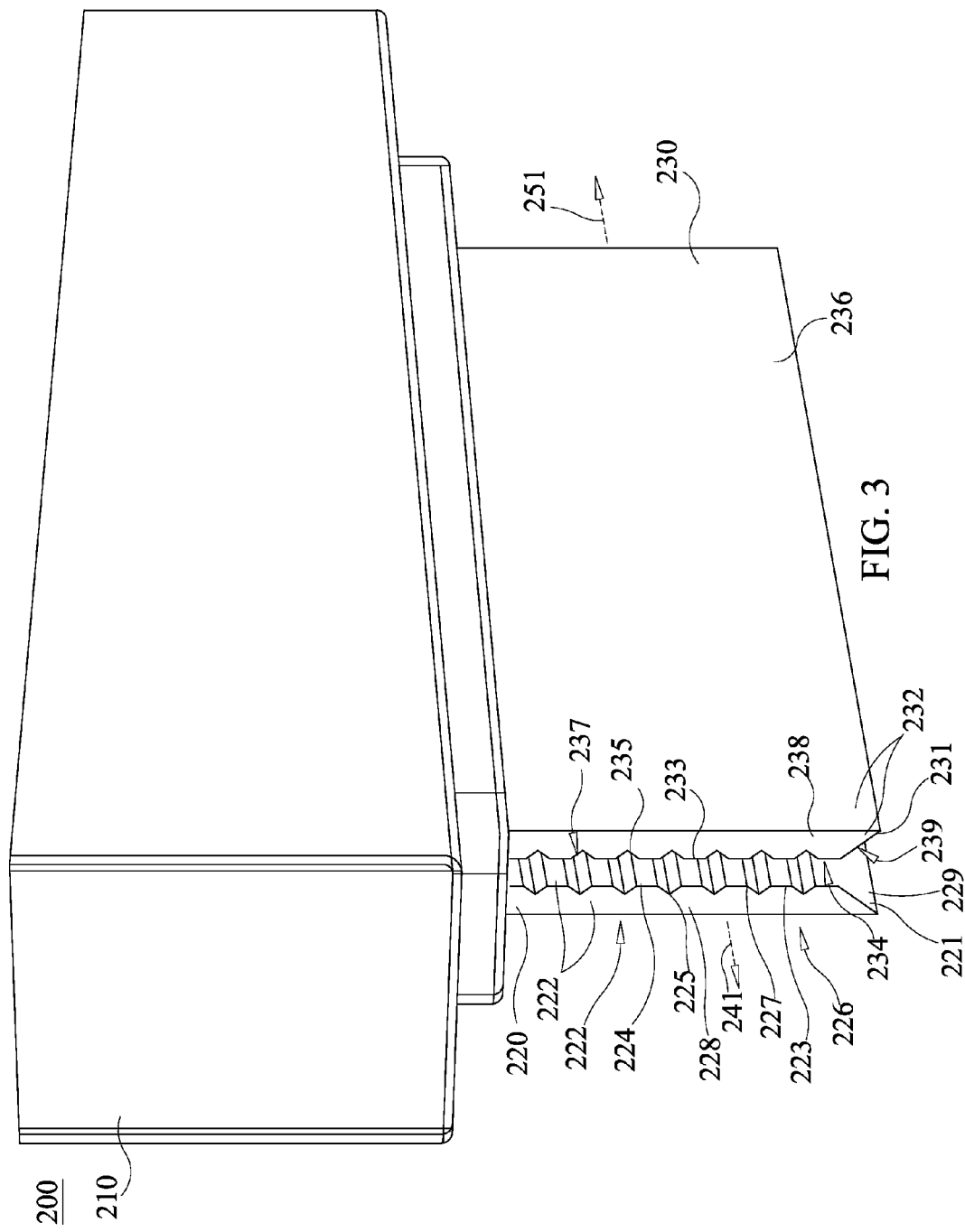
FIG. 3 is a perspective view of an edge lit lighting device having two optics according to an embodiment of the invention.
Figure 4:
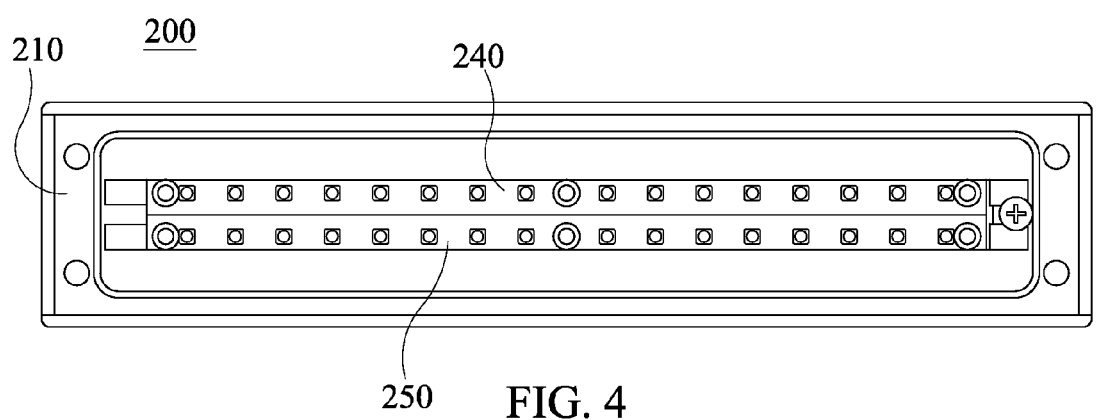
FIG. 4 is a bottom view of the lighting device of FIG. 3 with the optics removed.

Referring now to FIGS. 3 and 4, another embodiment of the present invention is depicted. A lighting device 200 is presented therein having substantial similarity to the light device 100 depicted in FIGS. 1 and 2, selectively including any and all of the characteristics, elements, and features as described hereinabove. The lighting device 200 may include a housing 210, a first optic 220, a second optic 230, a first light source 240, and a second light source 250. The housing 210 may be generally the same as the housing 110 of FIGS. 1 and 2, with the exception that the housing 210 is configured to carry two optics and two light sources. Moreover, in the present embodiment, the housing 210 is configured to be attached to a ceiling.

Similar to the housing 210, each of the first and second optics 220, 230 may be substantially similar to the optic 120 as depicted in FIGS. 1 and 2, selectively including any and all of the characteristics, elements, and features as described hereinabove. The optics 220, 230 may each have a receiving surfaces (not shown) and a plurality of emitting surfaces 222, 232, including a first emitting surface 224, 234, a second emitting surface 226, 236, side emitting surfaces 228, 238, and a lower emitting surface 229, 239. Each of the respective surfaces may have characteristics similar or identical to those surfaces of the optic 120.

In the present embodiment, the first emitting surfaces 224, 234 may each comprise a plurality of features in the form of a plurality of vertical sections 223, 233, a plurality of first slanted sections 225, 235, and a plurality of second slanted sections 227, 237, all of which may be configured to redirect light in the direction of the second emitting surface 226, 236. The first slanted sections 225, 235 may be configured to be at a first angle relative to the vertical sections 223, 233, and the second slanted sections 227, 237 may be configured to be at a second angle relative to the vertical sections 223, 233. Each of the first and second angles may be configured so as to redirect light in the direction of one of the emitting surfaces 222, 232, such as the second emitting surface 226, 236. Moreover, each of the vertical sections 223, 233, the first slanted sections 225, 235, and the second slanted sections 227, 237 may be configured to include features to enhance the redirection of light therefrom, including surface texturing and the application of a reflective material thereto. Moreover, each of the optics 220, 230, may further include a tapered end 221, 231 that tapers from the first emitting surface 224 in the direction of the second emitting surface 226. The tapered ends 221, 231 may be configured to have an angle approximately equal to the angle of the second slanted sections 227, 237, or they may be configured to have an angle that is unequal. The tapered ends 221, 231 may define the lower surfaces 228, 238, of the optics 220, 230.

In some embodiments, the optics 220, 230 may be formed so as to be identical to one another. In some embodiments, the optics 220, 230 may be formed so as to have differences, in such examples as shape, size, distribution of light emitted thereby, and any other characteristic. Moreover, the housing 210 may be configured so as to define the position and orientation of the optics 220, 230, to each other. In the present embodiment, the housing 210 is configured to carry the optics 220, 230 generally about parallel to each other such that their respective second emitting surfaces 226, 236 face each other, and such that their respective first emitting surfaces 224, 234 face generally away from each other, in opposite directions. More specifically, each of the first and second optics 220, 230 may define respective longitudinal horizontal axes 241, 251, and the optics 220, 230 may be carried by the housing 210 such that each respective longitudinal horizontal axes are parallel or about parallel too each other. In other embodiments, the housing 210 may be configured to carry the optics 220, 230 in any non-parallel orientation. More specifically, the optics 220, 230 may be carried by the housing 210 such that each respective longitudinal horizontal axes are non-parallel too each other, such as, for example, about perpendicular. Additionally, in some embodiments, the housing 210 may be configured to permit the first optic 220 to attach at a first elevation and the second optic 230 to attach at a second elevation.

Similar to the housing 210 and the optics 220, 230, each of the first and second light sources 240, 250 may be substantially similar to the light source 130 of FIGS. 1 and 2, selectively including any and all of the characteristics, elements, and features as described hereinabove. The first light source 240 may be associated with the first optic 220 such that light emitted by the first light source 240 is incident upon and received mostly or entirely by the first optic 220, and the second light source 250 may be associated with the second optic 230 such that light emitted by the second light source 250 is incident upon and received mostly or entirely by the second optic 230. Additionally, the housing 210 may be configured to carry the first and second light sources 240, 250 in the same position and orientation with respect to each other as between the first and second optics 220, 230.

In some embodiments, the first and second light sources 240, 250 may be configured to be similar or identical. For example, each may be configured to emit light in the same distribution across their respective associated optic, and each may be configured to emit light such that light emitted the their respective optics are similar or identical. In some embodiments, the first light source 240 may be configured to emit light having a first characteristic, and the second light source 250 may be configured to emit light having a second characteristic. Moreover, each of the first and second light sources 240, 250 may be operated to vary individual characteristics of light emitted thereby. The types of characteristics that may vary between and within the first and second light sources 240, 250 includes, but is not limited to, brightness, color, color rendering index, spectral power distribution, and the like.

Additionally, in some embodiments, the lighting device 200 may be used to convey information. For example, the driver circuit, as recited hereinabove, may be configured to operate the first light source 240 to emit light within a first wavelength range corresponding to a first color, and the second light source 250 to emit light within a second wavelength range corresponding to a second color. For example, the first color may be red, indicating to an observer that danger may be present in the direction of the lighting device 200 and continuing in that same direction from the perspective of the observer. Furthermore, the second color may be green, indicating an absence of danger in the direction of the lighting device 200 and continuing in that same direction from the perspective of the observer. More information related to such a communication system may be found in U.S. patent application Ser. No. 13/969,103 entitled Luminaire to Emit Light Responsive to an Emergency Alert and Associated Methods filed Aug. 16, 2013, the content of which is incorporated by reference in its entirety herein.

Figure 5:
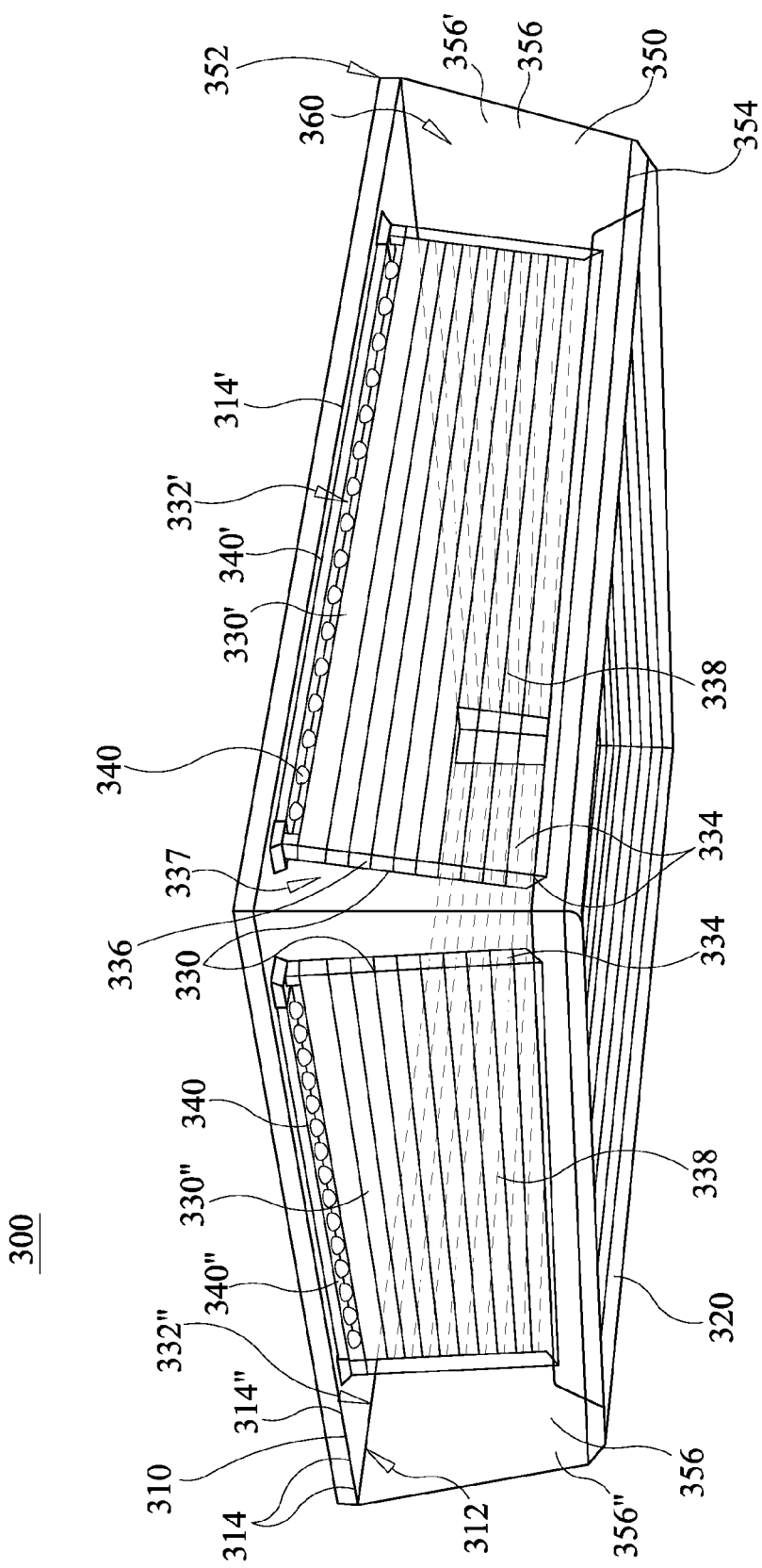
FIG. 5 is a lower perspective view of a lighting device having for optics according to an embodiment of the invention.

Referring now to FIG. 5, an additional embodiment of the present invention is depicted. In this embodiment, a lighting device 300 may include an upper housing 310, a lower housing 320, a plurality of primary optics 330, a plurality of light sources 340, and a secondary optic 350. As in the previous embodiments of the invention, particularly the lighting device 200, each light source 340 of the plurality of light sources 340 may be associated and positioned in optical communication with an optic 330 of the plurality of primary optics 330. More specifically, a first light source 340' may be positioned in optical communication with a receiving surface 332' of a first primary optic 330'. Similarly, a second light source 340" may be positioned in optical communication with a receiving surface 332" of a second primary optic 330". This type of association and positioning in optical communication may be applied to pairs of light sources 340 and primary optics 330 until each light source 340 of the plurality of light sources 340 is positioned in optical communication with a receiving surface 332 of a primary optic 330 of the plurality of primary optics 330. In the present embodiment, the plurality of primary optics 330 includes four optics 330, and the plurality of light sources 340 similarly includes four light sources 340. It is contemplated an included within the scope of the invention that each primary optic 330 of the plurality of primary optics 330 may be associated and positioned in optical communication with more than one light source 340, or that more than one primary optic 330 of the plurality of primary optics 330 may be positioned in optical communication with a single light source 340.

The upper housing 310 may be configured to define an upper section of the lighting device 300. Additionally, the upper housing 310 may be configured to permit various elements of the lighting device 300 to be attached thereto and carried thereby. For example, in the present embodiment, each light source 340 of the plurality of light sources 340 may be attached to and carried by a lower surface 312 of the upper housing 310. Furthermore, in some embodiments, the plurality of primary optics 330 may be attached to and carried by the plurality of light sources 340. The lower surface 312 may be configured so as to facilitate the attachment of elements of the lighting device 300 thereto. In the present embodiment, the lower surface 312 may have a generally flat configuration. In some other embodiments, the lower surface 312 may be configured to have a generally curved configuration. In such embodiments, the lower surface to 312 may have either of a generally convex or a generally concave curvature. Furthermore, the upper housing 310 may have a geometric configuration so as to define a shape of the lower surface 312. In the present embodiment, the lower surface 312 is generally square in shape. Any other geometric configuration is contemplated included within the scope of the invention, including, but not limited to, circles, ellipses, ovoids, triangles, rectangles, and any other polygon. Additionally, in some embodiments, the lower surface 312 may be configured to have a texture comprising a plurality of grooves, raised or recessed sections, and the like. Moreover, in some embodiments, the lower surface 312 may be configured to be reflective, reflecting light incident thereupon.

Furthermore, the shape of the lower surface 312 may be configured to have the same number of sides as there are primary optics 330 in the plurality of primary optics 330, the sides of the shape of the lower surface 312 each defining an edge 314 of the lower surface 312. In such embodiments, each edge 314 may be associated with a primary optic 330 of the plurality of primary optics 330. For example, a first edge 314' may be associated with a first primary optic 330', and a second edge 314" may be associated with a second primary optic 330". This type of association may be established between each edge 314 and a primary optic 330 of the plurality of primary optics 330.

Each light source 340 of the plurality of light sources 340 may be attached to the lower surface 312 such that each primary optic 330 associated with each light source 340 emits light in a selected direction. Generally, each light source 340 may be attached to the lower surface 312 in proximity to an edge 314 and away from a center of the lower surface 312. The direction in which light is selected to be emitted will determine the position on the lower surface 312 at which each light source 340 is attached. More specifically, each light source 340 may be positioned in proximity to an associated edge 314. The edge 314 which each light source 340 is associated may be the same edge 314 with which primary optic 330 associated with the light source 340 is associated with. For example, a first light source 340' may be associated with a first edge 314' and a second light source 340" may be associated with a second edge 314". Each light source 340 of the plurality of light sources 340 may be associated with an edge 314 such that every light source 340 is associated with an edge 314. Where each light source 340 is generally elongate in defines a longitudinal axis, the longitudinal axis of each light source 340 may be about parallel to a line defined by its associated edge 314. In some embodiments, a single light source 340 may be associated with more than one edge 314. In some other embodiments, a single edge 314 may be associated with more than one light source 340. Accordingly, the number of light sources 340 included in the plurality of light sources 340 may be, in some embodiments, equal to the number of sides defined by the shape of the lower surface 312, and in some other embodiments, may be fewer than or greater than the number of sites defined by the shape of the lower surface 312.

Additionally the upper housing 310 may be configured to facilitate the electrical coupling of each light source 340 of the plurality of light sources 340. This may be accomplished by the upper housing 310 including an internal cavity (not shown). The internal cavity may be configured to permit electrical connectors, such as wires, to be positioned therein, facilitating electrical coupling between each light source 340 and a circuit configured to enable and control the operation of each light source 340. For example, at least one of a power circuit and a driver circuit may be positioned within the internal cavity and electrically coupled to wires that are electrically coupled to each light source 340 of the plurality of light sources 340, thereby electrically coupling and positioning in electrical communication either or both of the power circuit and the driver circuit with the light sources 340. Furthermore, either of the power circuit and the driver circuit may be positioned in electrical communication with an external power source, as described hereinabove.

The upper housing 310 may further be configured to permit the attachment of the secondary optic 350 thereto, carrying the secondary optic 350 thereby. In some embodiments, the secondary optic 350 may be configured to conform to the shape of the lower surface 312. Accordingly, in the present embodiment, the secondary optic 350 is configured to have a generally box-like shape, such that an upper section 352 of the secondary optic 350 interfaces with the edges 314 of the upper housing 310. Moreover, the edges 314 may be configured to permit the attachment of the secondary optic 350 thereto by any means or method known in the art, including, but not limited to, glues, adhesives tang-and-slot systems, interference fits, fasteners, welding, and the like. The attachment of the secondary optic 350 to the upper housing 310 may partially define an optical chamber 360 within which the plurality of primary optics 330 and the plurality of light sources 340 may be positioned. Furthermore, the attachment between the secondary optic 350 and the lower surface 312 may form a fluid seal therebetween, partially sealing the optical chamber 360 from the environment surrounding the lighting device 300.

The upper housing 310 may be configured to be attached to a surface of an external structure as described hereinabove. For example, in the present embodiment, the upper housing 310 may be configured to be attached to a ceiling. The method of attachment may be any of those disclosed hereinabove.

The secondary optic 350 may be formed of any transparent or translucent material. Furthermore, the secondary optic 350 may be configured to cause light to be emitted from the lighting device 300 and a selected distribution. Accordingly, in some embodiments, the secondary optic 350 may include structural features and characteristics to refract reflects or otherwise redirect light such that light emitted by the lighting device 300 has the selected distribution. In some embodiments, the secondary optic 350 may collimate light passing therethrough. In some embodiments, the secondary optic 350 may diffuse light passing therethrough. In the present embodiment, the secondary optic 350 may be configured such that the upper section 352 defines a shape that is generally larger than a shape defined by a lower section 354 of the secondary optic 350. As a result of this, the various sections 356 between the upper section 352 and the lower section 354 may be slanted. In some embodiments, such a slant may result in the redirection of light passing through the secondary optic 350, generally downward. It is contemplated included within the scope of the invention that the secondary optic 350 may be configured to redirect light passing therethrough in any direction.

In some embodiments, the secondary optic 350 may be configured to include a color conversion layer. The color conversion layer may be substantially the same as or identical to the color conversion layer as described hereinabove. Such a color conversion layer may be in addition to a color conversion layer of any other element of the lighting device 300, including the plurality of primary optics 330, or such a color conversion layer may be the only color conversion layer of the lighting device 300.

It is contemplated and within the scope of the invention that a secondary optic, similar to the secondary optic 350 as disclosed in the present embodiment, may be implemented in any other embodiment of the present invention, including the lighting device 100 or the lighting device 200 as presented hereinabove. In such embodiments, a secondary optic may carried by the housing 110 or the housing 210 and may generally circumscribe the optic 120 or the optics 220. Additionally, the secondary optic in such embodiments may form a fluid seal with the housing 110 or the housing 210, thereby sealing the optic 120 or the optics 220 from the environment surrounding the lighting device 100 or the lighting device 200.

Each primary optic 330 of the plurality of primary optics 330 may be substantially similar to the optics as depicted and described in the embodiments hereinabove. Accordingly, it may incorporate any or all of the features of the optics presented hereinabove. Each primary optic 330 may be configured to receive light from an associated light source 340 at a receiving surface 332 and redirect the received light so as to be emitted from one or more emitting surfaces 334. In some embodiments a first emitting surface 336 may include a plurality of features 337 configured to redirect light in the direction of the second emitting surface 338. The plurality of features 337 may be configured as any of the features described hereinabove.

The direction in which the second emitting surface 338 emits light may be determined in part by the placement of the primary optic 330 on the lower surface 312. In the present embodiment, the second emitting surface 338 each primary optic 330 may be positioned such that light emitted therefrom in the direction of an edge 314 associated with the primary optic 330. For example, a first primary optic 330' may be positioned such that its second emitting surface 338 emits light in the direction of a first edge 314'. Similarly, a second primary optic 330" may be positioned such that its second emitting surface 338 emits light in the direction of a second edge 314". Similarly, each remaining primary optic 330 of the plurality of primary optics 330 may be positioned so as to emit light generally in the direction with and associated edge 314. The edge 314 with which each primary optic 330 is associated with may be determined by the edge 314 that is associated with the light source 340 associated with the primary optic 330. Accordingly, in some embodiments, each optic 330 may be associated with an edge 314. In some embodiments, one primary optic 330 may be the only primary optic 330 of the plurality of primary optics 330 associated with a given edge 314. In some embodiments, more than one primary optic 330 may be associated with a given edge 314. In some embodiments, one primary optic 330 may be associated more than one edge 314.

Furthermore, the plurality of primary optics 330 may be positioned such that the second emitting surface 338 of each primary optic 330 may emit light in a direction generally away from the center of the lower surface 312. Additionally, the primary optics 330 may be positioned such that the second emitting surface 338 of each primary optic 330 may emit light in a direction generally towards the secondary optic 350. More specifically, each primary optic 330 may be positioned such that the second emitting surface 338 may emit light in a direction generally towards a section 356 of the secondary optic 350 that is nearest the primary optic 330. Where the secondary optic 350 generally conforms to the shape of the lower surface 312, the second emitting surface 338 of each primary optic 330 may emit light in a direction generally towards a section 356 of the secondary optic 350 that is associated with the edge 314 associated with the primary optic 330. For example, a first primary optic 330' may be positioned such that light emitted by its second emitting surface 338 is emitted in the direction of a first section 356' of the secondary optic 350, and a second primary optic 330" may be positioned such that light emitted by its second emitting surface 338 is emitted in the direction of a second section 356" of the secondary optic 350. The remaining primary optics 330 the plurality of primary optics 330 may be similarly positioned according to this pattern.

Similar to the light sources 340, the plurality of primary optics 330 may be positioned so as to generally conform to the shape of the lower surface 312. More specifically, the position of each primary optic 330 with relation to the other primary optics 330 may be similar to the position of the edge 314 associated with primary optic 330 with relation to the other edges 314. Accordingly, in the present embodiment, the plurality of primary optics 330 is positioned into a generally box-like configuration. Any configuration and arrangement of the plurality of primary optics 330 is contemplated and included within the scope of the invention. More specifically, any configuration of the shape of the lower surface 312 may be reflected and generally adhered to in the positioning of the plurality of primary optics 330. Accordingly, in some embodiments, the plurality of primary optics 330 may include a number of primary optics 330 equal to the number of sides defined by the shape of the lower surface 312. In some embodiments, the plurality of primary optics 330 may include a number of primary optics 330 fewer than or more than the number of sides defined by the shape of the lower surface 312.

The secondary optic 350 may be configured to permit the lower housing 320 to be attached thereto. Any means or methods of attachment may be employed to attach the lower housing 320 to the secondary optic 350. The lower housing 320 may be attached to a lower section 354 of the secondary optic 350. Moreover, the attachment of the lower housing 320 to the secondary optic 350 may permit the lower housing 320 to be carried by the secondary optic 350. Furthermore, the attachment between the secondary optic 350 and the lower housing 320 may complete the definition of the optical chamber 360. Additionally, the attachment between the secondary optic 350 and the lower housing 320 may form a fluid seal therebetween. Accordingly, in conjunction with the fluid seal formed between the secondary optic 350 and the lower surface 312 of the upper housing 310, the fluid seal formed between the secondary optic 350 and the lower housing 320 may completely seal the optical chamber 360 fluidically from the environment surrounding the lighting device 300, thereby preventing the occlusion of light resulting from attachment of environmental contaminant, such as dust or other particulate matter, upon the primary optics 330.

Figure 6:
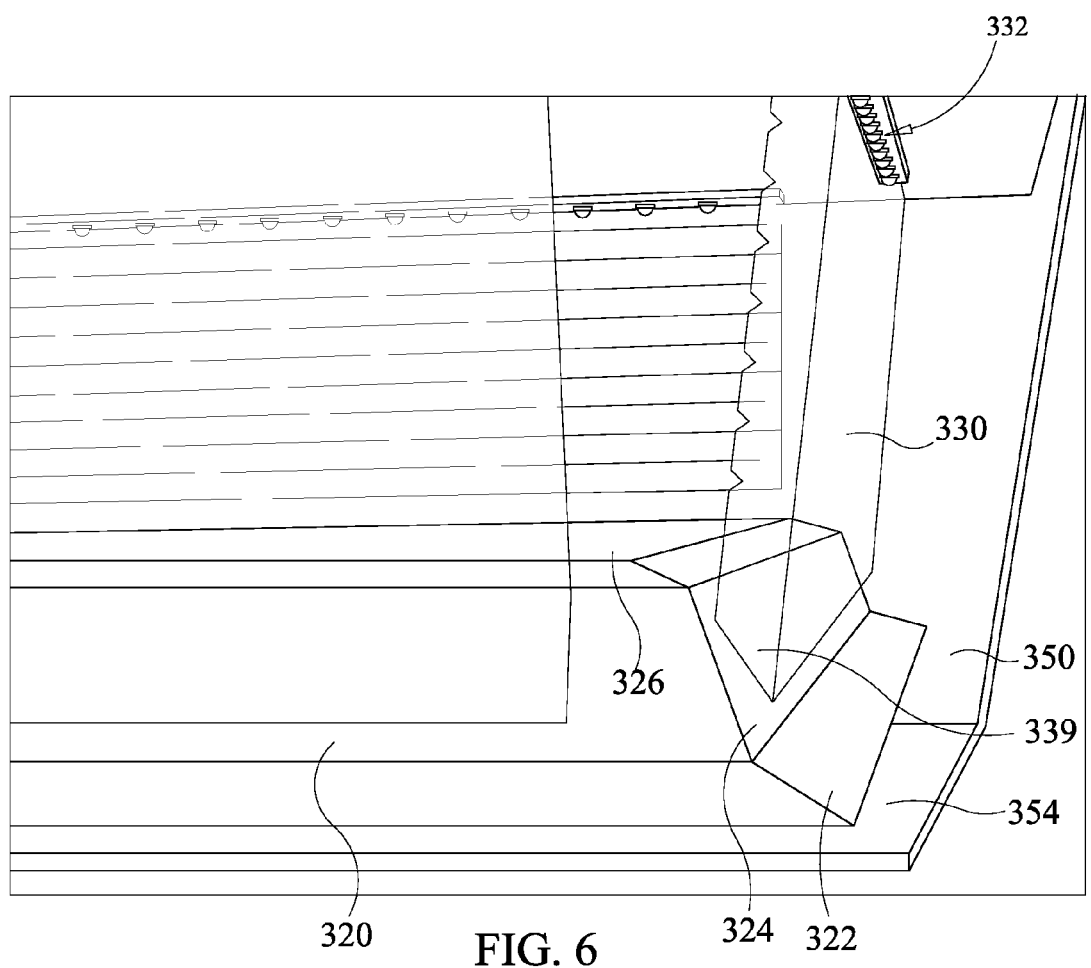
FIG. 6 is a partial side elevation view of the lighting device of FIG. 5.

Referring now to FIG. 6, the lower housing 320 will now be discussed in greater detail. The lower housing 320 may include a first plurality of slanted edges 322, a second plurality of slanted edges 324, and an upper surface 326. The upper surface 326 may contribute to the definition of the optical chamber 360, defining a lower surface of the optical chamber 360. In some embodiments, the first plurality of slanted edges 322 may be configured to interface with the lower section 354 of the secondary optic 350. In some embodiments, the second plurality of slanted edges 324 may be configured to facilitate the positioning of the plurality of primary optics 330 within the optical chamber 360. More specifically, the second plurality of slanted edges 324 may permit the plurality of primary optics 330 to extend generally downward beyond a plane defined by the upper surface 326.

In some embodiments, the second plurality of slanted edges 324 may be configured to interface with the plurality of primary optics 330. More specifically, the second plurality of slanted edges 324 may be slanted at an angle that is approximately equal to an angle formed by a taper 339 of the plurality of primary optics 330. Furthermore, in some embodiments, the one or more of the plurality of primary optics 330 may be attached to the second plurality of slanted edges 324 according to any means a method known in the art. In such embodiments, the plurality of primary optics 330 may be positioned such that light emitted by the light sources 340 is effectively received by the receiving surface 332 the plurality of primary optics 330. In some embodiments, the receiving surface 332 of each primary optic 330 may interface with a surface of the associated light source 340. In some embodiments, the receiving surface 332 of each primary optic 330 may be offset from a surface of the associated light source 340. In some embodiments, the light sources 340 may be configured to emit light in a direction generally towards the receiving surface 332 of the associated primary optic 330.

Similar to the secondary optic 350, it is contemplated and included within the scope of the invention that the lower housing 320 may be included in either of the embodiments of the invention presented herein above, specifically with either of the lighting device 100 with the lighting device 200.

In some embodiments, the lower housing 320 may be formed of a material that is generally transparent or translucent. Furthermore, the lower housing 320 may be configured to refract, reflect, collimate, diffuse, or otherwise redirect light incident thereupon and passing therethrough. Additionally, in some embodiments, the lower housing 320 may include a color conversion layer as described hereinabove. In some embodiments, the lower housing 320 and the secondary optic 350 may be integrally formed as a single structural element.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. An edge lit lighting device comprising:
    a rectangular prism shaped housing comprising an upper housing having a lower surface;
    a plurality of light sources attached to the lower surface; and
    a plurality of primary optics, each primary optic being associated with a light source of the plurality of light sources and positioned in optical communication with the associated light source, each primary optic comprising
        a receiving surface positioned adjacent to the associated light source,
        a first surface, and
        a second emitting surface;
    wherein the primary optics are carried by the planar surfaces of the rectangular prism shaped housing;
    wherein the second emitting surface comprises a plurality of features configured to redirect light in the direction of the first surface;
    wherein the plurality of light sources and plurality of primary optics are positioned so as to emit light in the direction of a secondary optic; and
    wherein a primary optic of the plurality of primary optics is positioned so as to emit light in a direction approximately orthogonal to another primary optic of the plurality of primary optics.

2. The lighting device of claim 1 wherein at least two polygonal primary optics are oriented at angles of 90 degrees or greater with respect to each other.

3. The lighting device of claim 1 wherein the plurality of primary optics are attached to a lower housing.

4. The lighting device of claim 3 wherein each of the upper housing, the secondary optic, and the lower housing cooperate to define an optical chamber; and wherein the optical chamber is sealed fluidically from the environment surrounding the lighting device.

5. The lighting device of claim 1 wherein the secondary optic comprises a plurality of sections; wherein each primary optic of the plurality of primary optics is associated with a section of the plurality of sections of the secondary optic; and wherein each primary optic of the plurality of primary optics is configured to emit light in the direction of its associated section of the secondary optic.

6. The lighting device of claim 1 wherein the light source comprises a plurality light-emitting diodes (LEDs).

7. The lighting device of claim 6 wherein the plurality of LEDs are arranged into a geometric configuration corresponding to an arrangement of the plurality of primary optics.

8. The lighting device of claim 1 wherein the light source is configured to provide light generally uniformly across a length of the receiving surface of each primary optic of the plurality of primary optics.

9. The lighting device of claim 1 wherein each primary optic of the plurality of primary optics is configured to emit light from the second emitting surface generally uniformly in a left-to-right perspective.

10. The lighting device of claim 1 wherein each primary optic of the plurality of primary optics is configured to emit light from the second emitting surface generally uniformly in a top-to-bottom perspective.

11. The lighting device of claim 1 wherein the second emitting surface of the plurality of primary optics is substantially smooth.

12. The lighting device of claim 1 wherein the plurality of features comprises alternating generally horizontal sections and slanted sections.

13. The lighting device of claim 1 wherein at least one of the plurality of primary optics and the secondary optic comprises a color conversion layer configured to receive light within a first wavelength range and to emit light within a second wavelength range.

14. The lighting device of claim 1 wherein at least one primary optic of the plurality of primary optics has a generally rectangular configuration.

15. The lighting device of claim 1 wherein a primary optic of the plurality of primary optics is oriented at an angle of approximately 90 degrees from another primary optic of the plurality of primary optics.

* * * * *